(12) United States Patent
Liu et al.

(10) Patent No.: US 12,502,520 B2
(45) Date of Patent: Dec. 23, 2025

(54) CONSTRAINT DELIVERY—HINGE AND CONSTRAINT DELIVERY—CORSET

(71) Applicant: Boston Scientific Scimed Inc., Maple Grove, MN (US)

(72) Inventors: Qian Liu, Maple Grove, MN (US); Brian R. Reynolds, Ramsey, MN (US)

(73) Assignee: Boston Scientific Scimed Inc., Maple Grove, MN (US)

( * ) Notice: Subject to any disclaimer, the term of this patent is extended or adjusted under 35 U.S.C. 154(b) by 708 days.

(21) Appl. No.: 17/560,009

(22) Filed: Dec. 22, 2021

(65) Prior Publication Data

US 2023/0248960 A1     Aug. 10, 2023

Related U.S. Application Data

(60) Provisional application No. 63/129,211, filed on Dec. 22, 2020.

(51) Int. Cl.
*A61M 60/13*     (2021.01)
*A61F 2/24*      (2006.01)
(Continued)

(52) U.S. Cl.
CPC ........... *A61M 60/13* (2021.01); *A61F 2/2466* (2013.01); *A61M 60/857* (2021.01); *A61M 60/865* (2021.01)

(58) Field of Classification Search
CPC .. A61M 60/13; A61M 60/857; A61M 60/865; A61M 60/237; A61M 60/81; A61F 2/2466; A61F 2/24
See application file for complete search history.

(56) References Cited

U.S. PATENT DOCUMENTS

| 4,944,722 A | 7/1990 | Carriker et al. |
| 5,527,159 A | 6/1996 | Bozeman, Jr. et al. |

(Continued)

FOREIGN PATENT DOCUMENTS

| WO | 2013025470 A2 | 2/2013 | |
| WO | WO-2020040699 A1 * | 2/2020 | ........... A61F 2/2466 |

OTHER PUBLICATIONS

International Search Report and Written Opinion for International Application No. PCT/US2021/064993 dated May 4, 2022, 13 pages.

*Primary Examiner* — Lynsey C Eiseman
*Assistant Examiner* — Christopher J Mutchler
(74) *Attorney, Agent, or Firm* — Seager, Tufte & Wickhem LLP (57) ABSTRACT

A method of delivering a medical device includes surrounding a deployment portion of the medical device with a sleeve that includes a sleeve wall and a securement portion positioned thereat and that is actuatable between secured and unsecured states, the sleeve configured to overlay the deployment portion to be delivered together with the deployment portion and to facilitate movement thereof through a delivery lumen during delivery of the medical device and configured to radially move between expanded and constrained configurations via actuation of the securement portion such that the sleeve is in the constrained configuration and the expanded configuration when the securement portion is in the secured and unsecured states respectively; inserting the deployment portion and sleeve together into a body lumen with the sleeve in the secured state; causing the sleeve to transition from the secured state to the unsecured state; and withdrawing the sleeve from the body lumen.

20 Claims, 8 Drawing Sheets

(51) Int. Cl.
  *A61M 60/857* (2021.01)
  *A61M 60/865* (2021.01)
  *A61M 60/237* (2021.01)
  *A61M 60/81* (2021.01)

(56) References Cited

U.S. PATENT DOCUMENTS

| | | | |
|---|---|---|---|
| 5,947,892 | A | 9/1999 | Benkowski et al. |
| 6,176,848 | B1 | 1/2001 | Rau et al. |
| 7,731,675 | B2 | 6/2010 | Aboul-Hosn et al. |
| 8,376,707 | B2 | 2/2013 | McBride et al. |
| 8,641,752 | B1 | 2/2014 | Holm et al. |
| 8,684,904 | B2 | 4/2014 | Campbell et al. |
| 9,072,825 | B2 | 7/2015 | Pfeffer et al. |
| 9,162,017 | B2 | 10/2015 | Evans et al. |
| 9,327,067 | B2 | 5/2016 | Zeng et al. |
| 9,675,740 | B2 | 6/2017 | Zeng et al. |
| 9,964,115 | B2 | 5/2018 | Scheckel |
| 10,149,932 | B2 | 12/2018 | McBride et al. |
| 10,478,540 | B2 | 11/2019 | Scheckel et al. |
| 10,576,192 | B2 | 3/2020 | Muller et al. |
| 10,960,116 | B2 | 3/2021 | Campbell et al. |
| 11,020,582 | B2 | 6/2021 | Cambronne et al. |
| 11,110,264 | B2 | 9/2021 | Cambronne et al. |
| 11,253,693 | B2 | 2/2022 | Pfeffer et al. |
| 11,260,213 | B2 | 3/2022 | Zeng et al. |
| 11,311,712 | B2 | 4/2022 | Zeng et al. |
| 11,524,153 | B2 | 12/2022 | Alexander et al. |
| 11,666,747 | B2 | 6/2023 | Tuval et al. |
| 11,813,445 | B2 | 11/2023 | Alexander et al. |
| 11,839,754 | B2 | 12/2023 | Tuval et al. |
| 2008/0132747 | A1 | 6/2008 | Shifflette |
| 2008/0132748 | A1 | 6/2008 | Shifflette |
| 2008/0262337 | A1 | 10/2008 | Falwell et al. |
| 2012/0041254 | A1 | 2/2012 | Scheckel |
| 2013/0303831 | A1 | 11/2013 | Evans |
| 2014/0012065 | A1* | 1/2014 | Fitzgerald ............ A61M 60/13 600/16 |
| 2014/0107399 | A1 | 4/2014 | Spence |
| 2014/0200395 | A1 | 7/2014 | Shafi et al. |
| 2016/0096006 | A1 | 4/2016 | Cully et al. |
| 2016/0136343 | A1 | 5/2016 | Anagnostopoulos |
| 2018/0177581 | A1* | 6/2018 | Stecco ................ A61F 2/011 |
| 2018/0303990 | A1 | 10/2018 | Siess et al. |
| 2019/0015570 | A1* | 1/2019 | Muller ............... A61M 60/216 |
| 2019/0076167 | A1* | 3/2019 | Fantuzzi ........... A61B 17/3462 |
| 2019/0307589 | A1* | 10/2019 | Goldberg ............ B29D 23/00 |
| 2019/0321530 | A1 | 10/2019 | Cambronne et al. |
| 2020/0297491 | A1* | 9/2020 | Argento ............. A61F 2/2457 |
| 2020/0323670 | A1 | 10/2020 | Honeyfield et al. |
| 2021/0170081 | A1* | 6/2021 | Kanz ................ A61M 25/007 |

* cited by examiner

CONSTRAINT DELIVERY—HINGE AND CONSTRAINT DELIVERY—CORSET

CROSS REFERENCE TO RELATED APPLICATION

This application claims priority to Provisional Application No. 63/129,211, filed Dec. 22, 2020, which is herein incorporated by reference in its entirety.

TECHNICAL FIELD

The present disclosure relates to delivery aids for percutaneous circulatory support devices. More specifically, the present disclosure relates to delivery sleeves for integrated braided cannulas in a circulatory support pump.

BACKGROUND

Circulatory support devices support the pumping action of the heart. These devices may be disposed through a valve opening such as, for example, an aortic valve. Often, circulatory support devices have a polymeric coating, which for example protects underlying components such as a mesh of the circulatory support devices. Such coatings, however, can make the circulatory support devices resistive to travel through lumens used for delivering such devices to treatment sites.

SUMMARY

In Example 1, a delivery device for a percutaneous medical device includes a sleeve and a tether assembly, the sleeve includes a sleeve wall and a securement portion that is positioned at the sleeve wall and is actuatable between a secured state and an unsecured state, the sleeve configured to overlay a deployment portion of the percutaneous medical device so as to be delivered together with the deployment portion and to facilitate movement thereof through a delivery lumen during delivery of the percutaneous medical device, the sleeve further configured to radially move between a constrained configuration and an expanded configuration via actuation of the securement portion such that the sleeve is in the constrained configuration when the securement portion is in the secured state and in the expanded configuration when the securement portion is in the unsecured state; the tether assembly engages the sleeve and is configured to cause the securement portion to actuate between the secured state when the percutaneous medical device is being delivered and the unsecured state prior to when the deployment portion of the percutaneous medical device is deployed, the tether assembly further configured to facilitate withdrawal of the sleeve from overlaying the deployment portion when the sleeve is in the expanded configuration and to facilitate withdrawal of the sleeve from the delivery lumen.

In Example 2, the delivery device of Example 1, wherein the sleeve is a constraint sleeve that is configured to constrain the deployment portion such that the deployment portion is constrained when the percutaneous medical device is being delivered and is unconstrained when the deployment portion has been deployed.

In Example 3, the delivery device as in any one of Examples 1 and 2, wherein the tether assembly comprises a plurality of tethers that includes a first tether and a second tether, wherein the first tether is configured to actuate the securement portion from the secured state to the unsecured state, and wherein the second tether is configured to facilitate withdrawal of the sleeve from overlaying the deployment portion when the sleeve is in the expanded configuration and to facilitate withdrawal of the sleeve from the delivery lumen.

In Example 4, the delivery device as in any one of Examples 1, 2, and 3, wherein the sleeve comprises a sheet that has a first edge and a second edge; wherein the securement portion comprises removably securing the first edge and the second edge; wherein removably securing the first edge to the second edge comprises lacing the first edge with the second edge; and wherein the tether assembly is configured to unlace the first edge and the second edge.

In Example 5, the delivery device as in any one of Examples 1, 2, and 3, wherein the sleeve comprises a film, and the securement portion comprises a severable portion of the film; wherein the film is a single continuous film having a first edge and a second edge such that the first and second edges are opposing edges of the single continuous film; wherein the severable portion includes the first and second edges; and wherein the tether assembly is configured to cause the first edge to sever from the second edge.

In Example 6, the delivery device as in any one of Examples 1-5, wherein the sleeve provides a lower delivery force than that of the percutaneous medical device.

In Example 7, a delivery assembly for a percutaneous medical device includes an introducer and a delivery device; the introducer configured to removably house a deployment portion of the percutaneous medical device in a delivery lumen of the introducer; and the delivery device for the percutaneous medical device include a sleeve and a tether assembly, the sleeve includes a sleeve wall and a securement portion that is positioned at the sleeve wall and is actuatable between a secured state and an unsecured state, the sleeve configured to overlay the deployment portion of the percutaneous medical device so as to be delivered together with the deployment portion and to facilitate movement thereof through the delivery lumen during delivery of the percutaneous medical device, the sleeve further configured to radially move between an expanded configuration and a constrained configuration via actuation of the securement portion such that the sleeve is in the constrained configuration when the securement portion is in the secured state and in the expanded configuration when the securement portion is in the unsecured state; and the tether assembly engages the sleeve and is configured to cause the securement portion to actuate between the secured state when the percutaneous medical device is being delivered and the unsecured state prior to when the deployment portion of the percutaneous medical device is deployed, the tether assembly further configured to facilitate withdrawal of the sleeve from overlaying the deployment portion when the sleeve is in the expanded configuration and to facilitate withdrawal of the sleeve from the delivery lumen.

In Example 8, the delivery assembly of Example 7, wherein the sleeve is a constraint sleeve that is configured to constrain the deployment portion such that the deployment portion is constrained when the percutaneous medical device is being delivered and is unconstrained when the deployment portion has been deployed.

In Example 9, the delivery assembly as in any one of Examples 7 and 8, wherein the tether assembly comprises a plurality of tethers that includes a first tether and a second tether, wherein the first tether is configured to actuate the securement portion from the secured state to the unsecured state, and wherein the second tether is configured to facilitate withdrawal of the sleeve from overlaying the deployment portion when the sleeve is in the expanded configuration and to facilitate withdrawal of the sleeve from the delivery lumen.

In Example 10, the delivery assembly as in any one of Examples 7, 8, and 9, wherein the sleeve comprises a sheet that has a first edge and a second edge; wherein the securement portion comprises removably securing the first edge and the second edge; wherein removably securing the first edge to the second edge comprises lacing the first edge with the second edge; and wherein the tether assembly is configured to unlace the first edge and the second edge.

In Example 11, the delivery assembly as in any one of Examples 7, 8, and 9, wherein the sleeve comprises a film, and the securement portion comprises a severable portion of the film; wherein the film is a single continuous film having a first edge and a second edge such that the first and second edges are opposing edges of the single continuous film; wherein the severable portion includes the first and second edges; and wherein the tether assembly is configured to cause the first edge to sever from the second edge.

In Example 12, the delivery assembly as in one of Examples 7-11, wherein the sleeve provides a lower delivery force than that of the percutaneous medical device.

In Example 13, a method of delivering a percutaneous medical device can include surrounding a deployment portion of the percutaneous medical device with a sleeve that includes a sleeve wall and a securement portion that is positioned at the sleeve wall and is actuatable between a secured state and an unsecured state, the sleeve configured to overlay the deployment portion of the percutaneous medical device so as to be delivered together with the deployment portion and to facilitate movement thereof through a delivery lumen during delivery of the percutaneous medical device, the sleeve further configured to radially move between an expanded configuration and a constrained configuration via actuation of the securement portion such that the sleeve is in the constrained configuration when the securement portion is in the secured state and in the expanded configuration when the securement portion is in the unsecured state; and inserting the deployment portion of the percutaneous medical device together with the sleeve into a body lumen with the sleeve in the secured state; causing the sleeve to transition from the secured state to the unsecured state; and withdrawing the sleeve from the body lumen.

In Example 14, the method of Example 13, further comprising inserting the percutaneous medical device together with the sleeve into a introducer, and wherein inserting the deployment portion includes inserting the introducer into the body lumen and moving the deployment portion distally relative to the introducer such that the deployment portion is outside of the introducer.

In Example 15, the method of any one of Examples 13 and 14, wherein a tether assembly is configured to cause the sleeve to transition from the secured state to the unsecured state and withdraw the sleeve from the body lumen; wherein a first tether of the tether assembly is configured to cause the sleeve to transition from the secured state to the unsecured state; and wherein a second tether of the tether assembly is configured to withdraw the sleeve from the body lumen.

In Example 16, a delivery device for a percutaneous medical device can include a sleeve and a tether assembly; the sleeve includes a sleeve wall and a securement portion that is positioned at the sleeve wall and is actuatable between a secured state and an unsecured state, the sleeve configured to overlay a deployment portion of the percutaneous medical device so as to be delivered together with the deployment portion and to facilitate movement thereof through a delivery lumen during delivery of the percutaneous medical device, the sleeve further configured to radially move between a constrained configuration and an expanded configuration via actuation of the securement portion such that the sleeve is in the constrained configuration when the securement portion is in the secured state and in the expanded configuration when the securement portion is in the unsecured state; and the tether assembly engages the sleeve and is configured to cause the securement portion to actuate between the secured state when the percutaneous medical device is being delivered and the unsecured state prior to when the deployment portion of the percutaneous medical device is deployed, the tether assembly further configured to facilitate withdrawal of the sleeve from overlaying the deployment portion when the sleeve is in the expanded configuration and to facilitate withdrawal of the sleeve from the delivery lumen.

In Example 17, the delivery device of Example 16, wherein the sleeve is a constraint sleeve that is configured to constrain the deployment portion such that the deployment portion is constrained when the percutaneous medical device is being delivered and is unconstrained when the deployment portion has been deployed.

In Example 18, the delivery device of Example 16, wherein the tether assembly comprises a plurality of tethers that includes a first tether and a second tether, wherein the first tether is configured to actuate the securement portion from the secured state to the unsecured state, and wherein the second tether is configured to facilitate withdrawal of the sleeve from overlaying the deployment portion when the sleeve is in the expanded configuration and to facilitate withdrawal of the sleeve from the delivery lumen.

In Example 19, the delivery device of Example 16, wherein the sleeve comprises a sheet that has a first edge and a second edge, and wherein the securement portion comprises removably securing the first edge and the second edge.

In Example 20, the delivery device of Example 19, wherein removably securing the first edge to the second edge comprises lacing the first edge with the second edge, and wherein the tether assembly is configured to unlace the first edge and the second edge.

In Example 21, the delivery device of Example 16, wherein the sleeve comprises a film, and the securement portion comprises a severable portion of the film.

In Example 22, the delivery device of Example 21, wherein the film is a single continuous film having a first edge and a second edge such that the first and second edges are opposing edges of the single continuous film, wherein the severable portion includes the first and second edges, and wherein the tether assembly is configured to cause the first edge to sever from the second edge.

In Example 23, the delivery device of Example 16, wherein the sleeve provides a lower delivery force than that of the percutaneous medical device.

In Example 24, a delivery assembly for a percutaneous medical device can include an introducer and a delivery device; the introducer configured to removably house a deployment portion of the percutaneous medical device in a delivery lumen of the introducer; and the delivery device for the percutaneous medical device can include a sleeve and a tether assembly; the sleeve includes a sleeve wall and a securement portion that is positioned at the sleeve wall and is actuatable between a secured state and an unsecured state, the sleeve configured to overlay the deployment portion of the percutaneous medical device so as to be delivered together with the deployment portion and to facilitate movement thereof through the delivery lumen during delivery of the percutaneous medical device, the sleeve further configured to radially move between an expanded configuration and a constrained configuration via actuation of the securement portion such that the sleeve is in the constrained configuration when the securement portion is in the secured state and in the expanded configuration when the securement portion is in the unsecured state; and the tether assembly engages the sleeve and is configured to cause the securement portion to actuate between the secured state when the percutaneous medical device is being delivered and the unsecured state prior to when the deployment portion of the percutaneous medical device is deployed, the tether assembly further configured to facilitate withdrawal of the sleeve from overlaying the deployment portion when the sleeve is in the expanded configuration and to facilitate withdrawal of the sleeve from the delivery lumen.

In Example 25, the delivery assembly of Example 24, wherein the sleeve is a constraint sleeve that is configured to constrain the deployment portion such that the deployment portion is constrained when the percutaneous medical device is being delivered and is unconstrained when the deployment portion has been deployed.

In Example 26, the delivery assembly of Example 24, wherein the tether assembly comprises a plurality of tethers that includes a first tether and a second tether, wherein the first tether is configured to actuate the securement portion from the secured state to the unsecured state, and wherein the second tether is configured to facilitate withdrawal of the sleeve from overlaying the deployment portion when the sleeve is in the expanded configuration and to facilitate withdrawal of the sleeve from the delivery lumen.

In Example 27, the delivery assembly of Example 24, wherein the sleeve comprises a sheet that has a first edge and a second edge, and wherein the securement portion comprises removably securing the first edge and the second edge.

In Example 28, the delivery assembly of Example 27, wherein removably securing the first edge to the second edge comprises lacing the first edge with the second edge, and wherein the tether assembly is configured to unlace the first edge and the second edge.

In Example 29, the delivery assembly of Example 24, wherein the sleeve comprises a film, and the securement portion comprises a severable portion of the film.

In Example 30, the delivery assembly of Example 29, wherein the film is a single continuous film having a first edge and a second edge such that the first and second edges are opposing edges of the single continuous film, wherein the severable portion includes the first and second edges, and wherein the tether assembly is configured to cause the first edge to sever from the second edge.

In Example 31, the delivery assembly of Example 24, wherein the sleeve provides a lower delivery force than that of the percutaneous medical device.

In Example 32, a method of delivering a percutaneous medical device can include surrounding a deployment portion of the percutaneous medical device with a sleeve that includes a sleeve wall and a securement portion that is positioned at the sleeve wall and is actuatable between a secured state and an unsecured state, the sleeve configured to overlay the deployment portion of the percutaneous medical device so as to be delivered together with the deployment portion and to facilitate movement thereof through a delivery lumen during delivery of the percutaneous medical device, the sleeve further configured to radially move between an expanded configuration and a constrained configuration via actuation of the securement portion such that the sleeve is in the constrained configuration when the securement portion is in the secured state and in the expanded configuration when the securement portion is in the unsecured state; and inserting the deployment portion of the percutaneous medical device together with the sleeve into a body lumen with the sleeve in the secured state; causing the sleeve to transition from the secured state to the unsecured state; and withdrawing the sleeve from the body lumen.

In Example 33, the method of Example 32 further comprising inserting the percutaneous medical device together with the sleeve into an introducer, and wherein inserting the deployment portion includes inserting the introducer into the body lumen and moving the deployment portion distally relative to the introducer such that the deployment portion is outside of the introducer.

In Example 34, the method of Example 32, wherein a tether assembly is configured to cause the sleeve to transition from the secured state to the unsecured state and withdraw the sleeve from the body lumen.

In Example 35, the method of Example 34, wherein a first tether of the tether assembly is configured to cause the sleeve to transition from the secured state to the unsecured state; and wherein a second tether of the tether assembly is configured to withdraw the sleeve from the body lumen.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Included in the present disclosure are circulatory support devices that have a decreased delivery force in comparison to conventional embodiments. For purposes of promoting an understanding of the principles of the present disclosure, reference is now made to the examples illustrated in the drawings, which are described below. The illustrated examples disclosed herein are not intended to be exhaustive or to limit the disclosure to the precise form disclosed in the following detailed description. Rather, these exemplary embodiments were chosen and described so that others skilled in the art may use their teachings. It is not beyond the scope of this disclosure to have a number (e.g., all) the features in a given example used across all examples. Thus, no one figure should be interpreted as having any dependency or requirement related to any single component or combination of components illustrated therein. Additionally, various components depicted in a given figure may be, in examples, integrated with various ones of the other components depicted therein (and/or components not illustrated), all of which are considered to be within the ambit of the present disclosure.

Figure 1A:
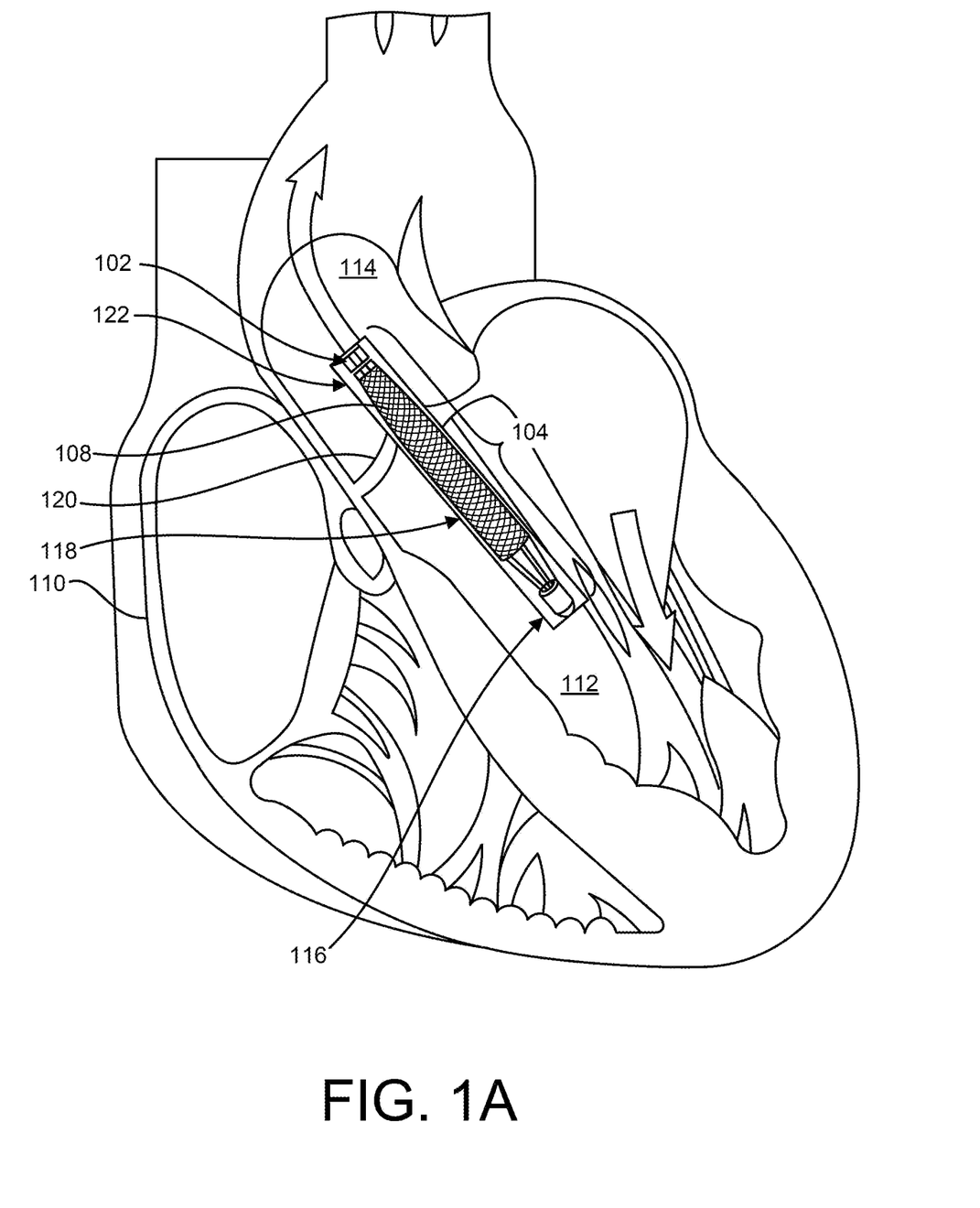
FIG. 1A depicts a conceptual diagram of a circulatory support device including a cannula and an adaptor, according to aspects of the present disclosure.

FIG. 1A depicts a conceptual diagram of a circulatory support device 102 including a cannula 104 and an adaptor 108, in accordance with embodiments of the subject matter disclosed herein. The circulatory support device 102 is shown arranged within a heart 110, According to embodiments, the circulatory support device 102 may include a ventricular assist device (shown in FIG. 1B), such as a pump, that is coupled to the cannula 104 by the adaptor 108. The ventricular assist device is configured to pump blood from the subject's left ventricle 112 into the subject's aorta 114. In embodiments, the circulatory support device 102 may be used to treat cardiogenic shock and other heart failure modalities.

In embodiments, a distal portion 116 of the circulatory support device 102 is arranged in the left ventricle 112. An intermediate portion 118 of the circulatory support device 102 extends through the aortic valve 120 so that a proximal portion 122 of the cannula 104 extends into the aorta 114. In embodiments, the proximal portion 122 of the cannula 104 is coupled to the adaptor 108 and the adaptor 108 is coupled to the circulatory support device 102. During operation, the circulatory support device 102 draws blood from the left ventricle 112, through the cannula 104 of the circulatory support device 102 and is released into the aorta 114. Additionally, or alternatively, the circulatory support device 102 may be used to facilitate pumping blood from some other aspect of the subject's vasculature into an adjacent portion of the vasculature.

Figure 1B:
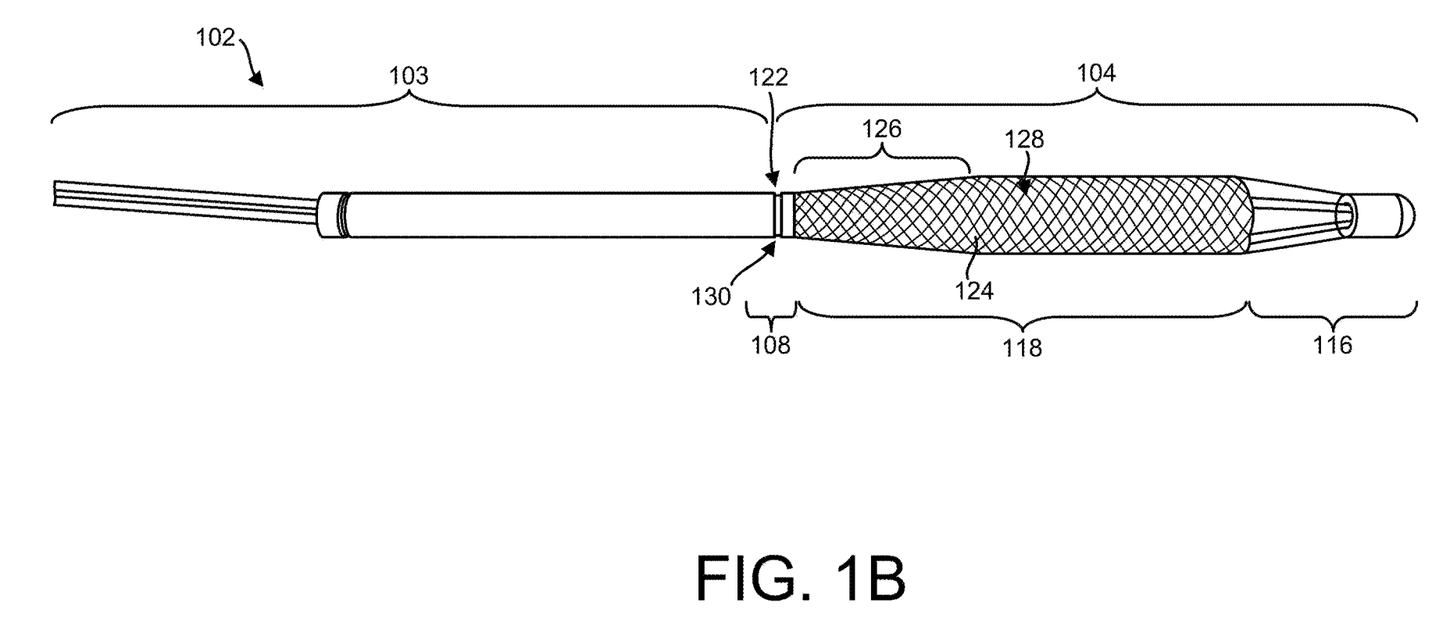
FIG. 1B depicts a side view of the circulatory support device depicted in FIG. 1A, including a pump, according to aspects of the present disclosure.

FIG. 1B depicts a side view of the circulatory support device 102 depicted in FIG. 1A including the ventricular assist device 103, in accordance with embodiments of the subject matter disclosed herein.

As stated above, the cannula 104 may include a proximal portion 122, an intermediate portion 118, and a distal portion 116. The intermediate portion 118 may include a braided mesh 124 that extends between the proximal portion 122 and the distal portion 116. In embodiments, the braided mesh 124 may have various braid angles and/or varying braid angles, as explained in more detail below. In embodiments, a proximal portion 126 of the braided mesh 124 may be tapered. The tapered proximal portion 126 may transition the braided mesh 124 from a larger diameter (e.g., greater than or equal to 5 millimeters (mm)) near a distal end 128 of the proximal portion 126 to a smaller diameter near a proximal end 130 of the braided mesh 124. In embodiments, the braided mesh 124 may be collapsed into a smaller diameter for delivery into the heart 110. Once arranged within the heart 110, the braided mesh 124 may be expanded to its larger diameter. By being able to expand to a larger diameter than its delivery configuration, the cannula 104 may provide larger flow rates than can be provided with a non-expandable smaller diameter cannula 104. In embodiments, the braided mesh 124 may be designed to adequately withstand the pressure gradient between the inside and the outside of the cannula 104.

In embodiments, the braided mesh 124 is coated with a membrane to form a conduit through the cannula 104 from the distal portion 116 to the proximal portion 122. In embodiments, the membrane may be silicone. In embodiments, the cannula 104 is formed from a plurality of nitinol wires having a diameter of 0.008". However, this is only an example and other types of wires having other diameters may be used to form the cannula 104. Additionally, or alternatively, wires having varying diameters may be used to form the cannula 104. In embodiments, the cannula 104 may be formed from a range of nitinol wires (e.g., 6 wires to 48 wires). While protective, the membrane coated over the braided mesh 124 can have a fairly resistive exterior that can prove troublesome during delivery of the circulatory support device 102, for example, by increasing the delivery force required to advance the cannula 104 through a delivery lumen during setup and/or in operation.

Figure 2:
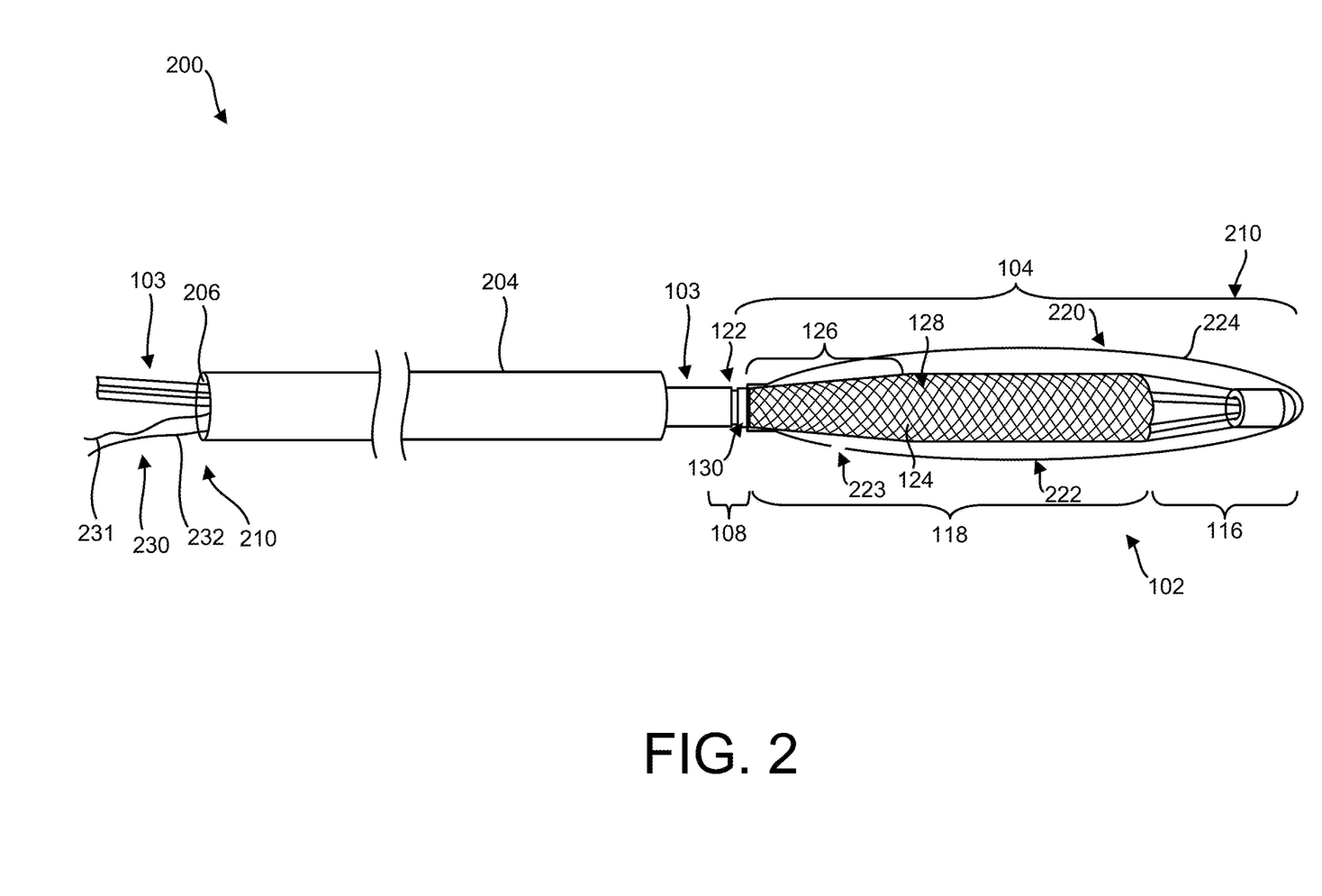
FIG. 2 depicts a sideview of a delivery assembly, according to aspects of the present disclosure.

Turning to FIG. 2, a delivery assembly 200 for a percutaneous medical device 102, such as the circulatory support device 102 is shown. The percutaneous medical device 102 includes a deployment portion 104, such as the cannula 104. For illustration purposes, the proximal direction is in the direction from right to left on the figure, and the distal direction is in the direction from left to right on the figure. Further, hereinafter, for ease of illustration, the percutaneous medical device 102 will be generally referred to as 102, and the deployment portion 104 will be generally referred to as 104. But it should be noted that using the delivery assembly 200 with other percutaneous medical devices 102 and their deployment portions is also contemplated and is therefore not outside the scope of this disclosure.

Considering the resistive nature of the membrane, the delivery assembly 200 can include an introducer 204, a delivery lumen 206 formed in the introducer 204, and a delivery device 210 to aide in delivery of the percutaneous medical device 102. The delivery lumen 206 can be configured to removably house a deployment portion 104 of the percutaneous medical device 102. For example, the introducer 204 can house the deployment portion 104 until it is inserted into a patient's vasculature. A delivery device 210 can include a sleeve 220 with a sleeve wall 222 and a securement portion 224 that is positioned at the sleeve wall 222. The sleeve 220 can be configured to overlay the deployment portion 104 of the percutaneous medical device 102 so as to be delivered together with the deployment portion 104 and to facilitate movement thereof through the delivery lumen 206 during delivery of the percutaneous medical device 102. It is noted, again, that the illustrated example here is just one of many examples. In addition, or in alternative, the delivery device 210 can include a tether assembly 230, which optionally includes first and second tethers 231, 232. Further details of the delivery device 210 and components thereof are discussed below.

As noted throughout, variations of the present disclosure are contemplated. For instance, although shown and discussed herein as involving a introducer 204, it is contemplated, and thus not outside the scope of this disclosure, that some examples of the delivery assembly 200 may not include an introducer 204 or may instead include a differently shaped or formed member that functions similarly to the introducer 204. As well, although depicted as being closed at both ends, the sleeve 220 can have one end open and the other end closed, or both ends open. Even these examples are just some of those which are contemplated and that would be appreciated by the skilled artisan when armed with this disclosure.

A resistance to insertion of the delivery device 210 through the delivery lumen 206 can be defined as a delivery force. The delivery force can be a function of an insertion depth such that the delivery force is highest at initial insertion or shortly thereafter and lowest when close to delivery. As noted above, the percutaneous medical device 102 has a fairly resistive exterior in the membrane, which results in a high delivery force. Traditional measures for reducing the delivery force include lubricating and/or wetting one or more portions of the delivery assembly 200, such as the cannula 104, the introducer 204, or both. These measures, however, may still result in a relatively high delivery force that is undesirable. In examples, the sleeve 220 can provide a lower delivery force than that of the percutaneous medical device 102. As well, the delivery force provided by the delivery device 210 can be lower than that of traditional lubricating measures, for example. In this regard, the delivery force can be reduced by as much as approximately 4× in some examples and on the order of approximately 3×, 2.5×, 2×, 1.5×, etc. in other examples.

In examples, the sleeve 220 is a constraint sleeve 220. In this regard, the sleeve 220 can be configured to constrain the deployment portion 104 such that the deployment portion 104 is constrained when the percutaneous medical device 102 is being delivered and is unconstrained when the deployment portion 104 has been deployed. The deployment portion 104 can be resilient to radial compression in a direction that is generally normal to an outer surface of the sleeve wall 222. Under these circumstances, the deployment portion 104 can have a nominal diameter when at rest and a constrained diameter, which is less than the nominal diameter, when constrained. In some such examples, prior to delivery and deployment, the sleeve 220 can be furled around a portion of the percutaneous medical device 102 (e.g., the deployment portion 104) so as to constrain the deployment portion 104 at the constrained diameter (e.g., in the delivery configuration of the circulatory support device 102). Just before deployment, the sleeve 220 can be unfurled so as to allow the deployment portion 104 to return to the nominal diameter. In other words, the deployment portion 104 can be surrounded by the sleeve 220 and at the constrained diameter until it is desired for the deployment portion 104 to be deployed, at which point the sleeve 220 can release the deployment portion 104 to return to the nominal diameter.

During setup, to move from a nominal diameter to a constrained diameter, the deployment portion 104 can be pulled into the sleeve 220. For example, the deployment portion 104 can be positioned adjacent to a first end of the sleeve 220. Then, the deployment portion 104 can be withdrawn into the sleeve 220 by pulling on a portion of the percutaneous medical device 102 to thereby move the deployment portion 104 relative to the sleeve 220. As portions of the deployment portion 104 enter into the sleeve 220, they can be gradually moved from the nominal diameter to the constrained diameter.

Release of the sleeve 220 from around the deployment portion 104 (whether constrained or unconstrained) can be controlled via a securement portion 224 of the sleeve 220. As prior noted, the sleeve 220 can include a sleeve wall 222 and a securement portion 224 that is positioned at the sleeve wall 222. The securement portion 224 can be actuatable between a secured state and an unsecured state. The sleeve 220 can be configured to radially move between a constrained configuration (e.g., when the sleeve 220 is furled as discussed above) and an expanded configuration (e.g., when the sleeve 220 is unfurled as discussed above) via actuation of the securement portion 224 such that the sleeve 220 is in the constrained configuration when the securement portion 224 is in the secured state and in the expanded configuration when the securement portion 224 is in the unsecured state.

Release of the sleeve 220 before deployment and removal of the sleeve 220 thereafter can be facilitated using a tether assembly 230 of suitable construction. In this regard, the tether assembly 230 can be attached (e.g., fixedly or removably) to the sleeve 220 so as to engage the sleeve 220. In examples, a length of the tether assembly 230 can be longer than a length of the introducer 204 such that a grabbable amount of the tether assembly 230 remains protruding from the proximal end 130 of the introducer 204 as the sleeve 220 is advanced through the introducer 204 and to a deployment site where the deployment portion 104 is deployed. The tether assembly 230 can be constructed of one or multiple materials, each of which is of sufficient rigidity to withstand the delivery force experienced by the sleeve 220, the deployment portion 104 being inserted (e.g., withdrawn) into the sleeve 220, and/or a grabbing force on the grabbable amount. The grabbing force can be the force required to unfurl the sleeve 220. Although in some instances, the grabbing force may be greater than the delivery force, in many instances, the grabbing force may be less than or equal to the delivery force. In some examples of the delivery device 210, the tether assembly 230 and the sleeve 220 can comprise the same material and/or can be integrally manufactured. In other examples, the sleeve 220 and the tether assembly 230 are separate components of the delivery device 210.

During operation, the tether assembly 230 can be configured to cause the securement portion 224 to actuate between the secured and unsecured states. For example, the tether assembly 230 can cause the securement portion 224 to actuate from the secured state when the percutaneous medical device 102 is being delivered to the unsecured state prior to when the deployment portion 104 of the percutaneous medical device 102 is deployed. For instance, as discussed in further detail below, the tether assembly 230 can cause the sleeve 220 to unfurl by pulling on the tether assembly 230 in the proximal direction. Under these circumstances, a radially outward force as the deployment portion 104 returns to the nominal diameter from the constrained diameter can aide in unfurling the sleeve 220.

Additionally, or alternatively, the tether assembly 230 can be configured to facilitate withdrawal of the sleeve 220 from overlaying the deployment portion 104 and/or from the delivery lumen 206. For example, pulling on the tether assembly 230 in the proximal direction can cause proportional movement of the sleeve 220. To begin, the sleeve 220 can be delivered while overlaying the deployment portion 104 (e.g., in the constrained configuration). When the sleeve 220 is in the expanded configuration just before the deployment portion 104 is deployed, the tether assembly 230 can be pulled using the grabbing force to thereby facilitate the sleeve 220 moving proximally so as to no longer overlay the deployment portion 104. Then, in addition or in alternative, the tether assembly 230 can be pulled using the grabbing force to thereby facilitate the withdrawal of the sleeve 220 from the delivery lumen 206.

While a single tether in some example, the tether assembly 230 in other examples can include a plurality of tethers. For instance, the plurality of tethers can include a first tether and a second tether. The first tether can be configured to actuate the securement portion 224 from the secured state to the unsecured state. The second tether can be configured to facilitate withdrawal of the sleeve 220 from overlaying the deployment portion 104 when the sleeve 220 is in the expanded configuration and to facilitate withdrawal of the sleeve 220 from the delivery lumen 206. In some examples, the first and second tethers 231, 232 can comprise different materials, each of which are better suited for their particular purpose. For example, the first tether can comprise a more rigid material than the second tether or vice versa. In other examples, the first and second tether can comprise approximately the same material.

Figure 3A:
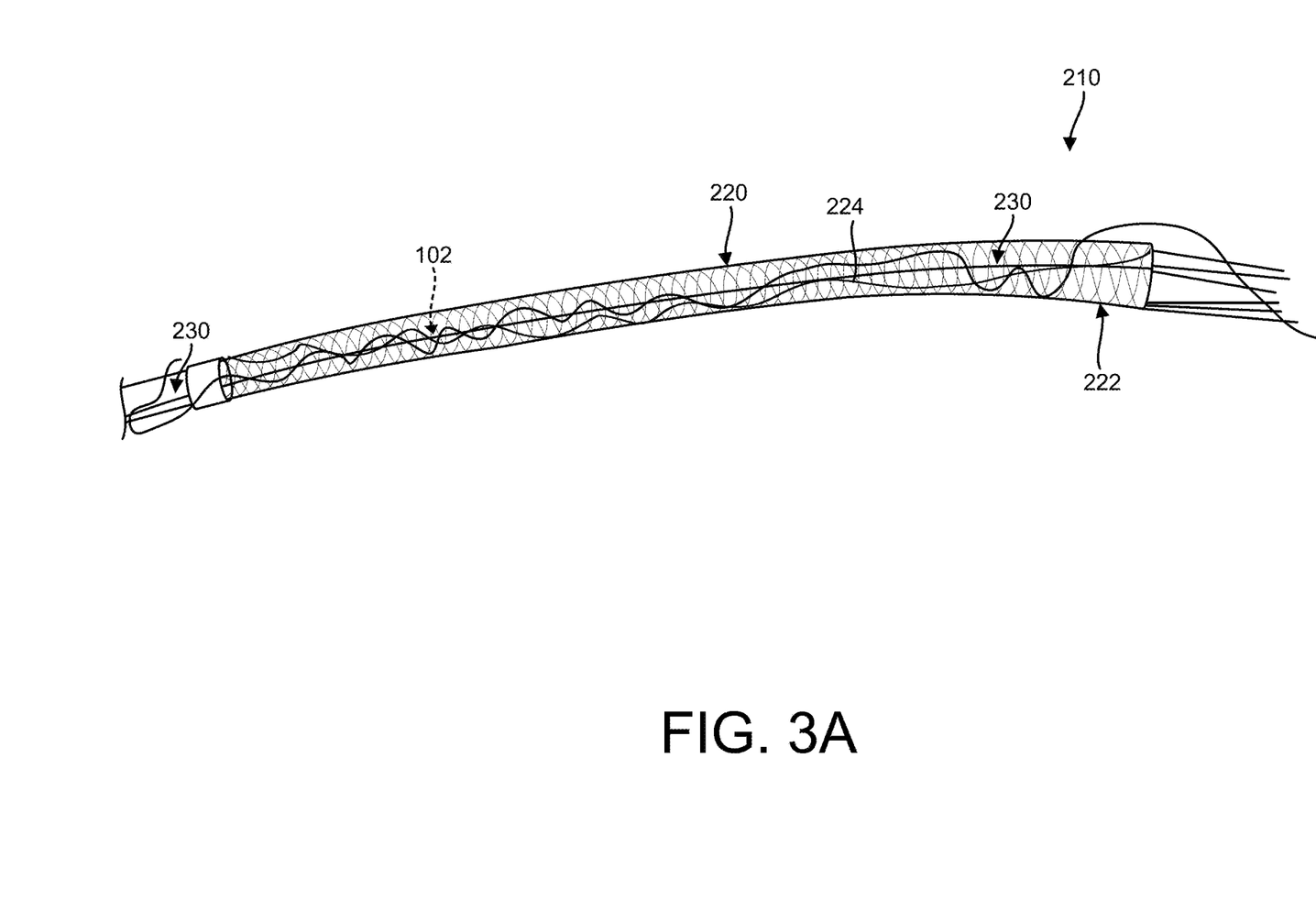
FIG. 3A depicts a first example of a sleeve in the constrained configuration, according to aspects of the present disclosure.
Figure 3B:
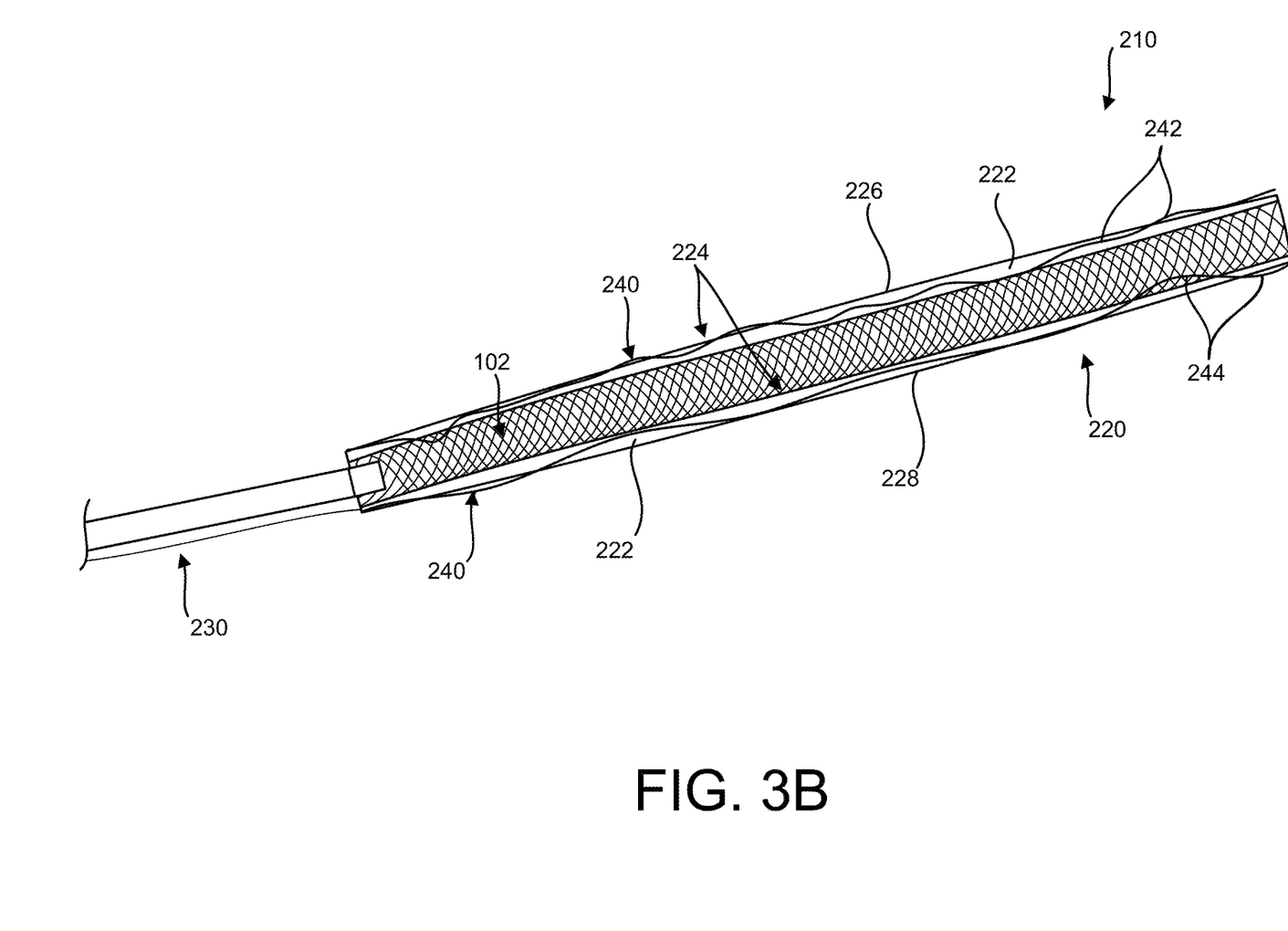
FIG. 3B depicts the first example of the sleeve in FIG. 3A in an expanded configuration, according to aspects of the present disclosure.
Figure 4A:
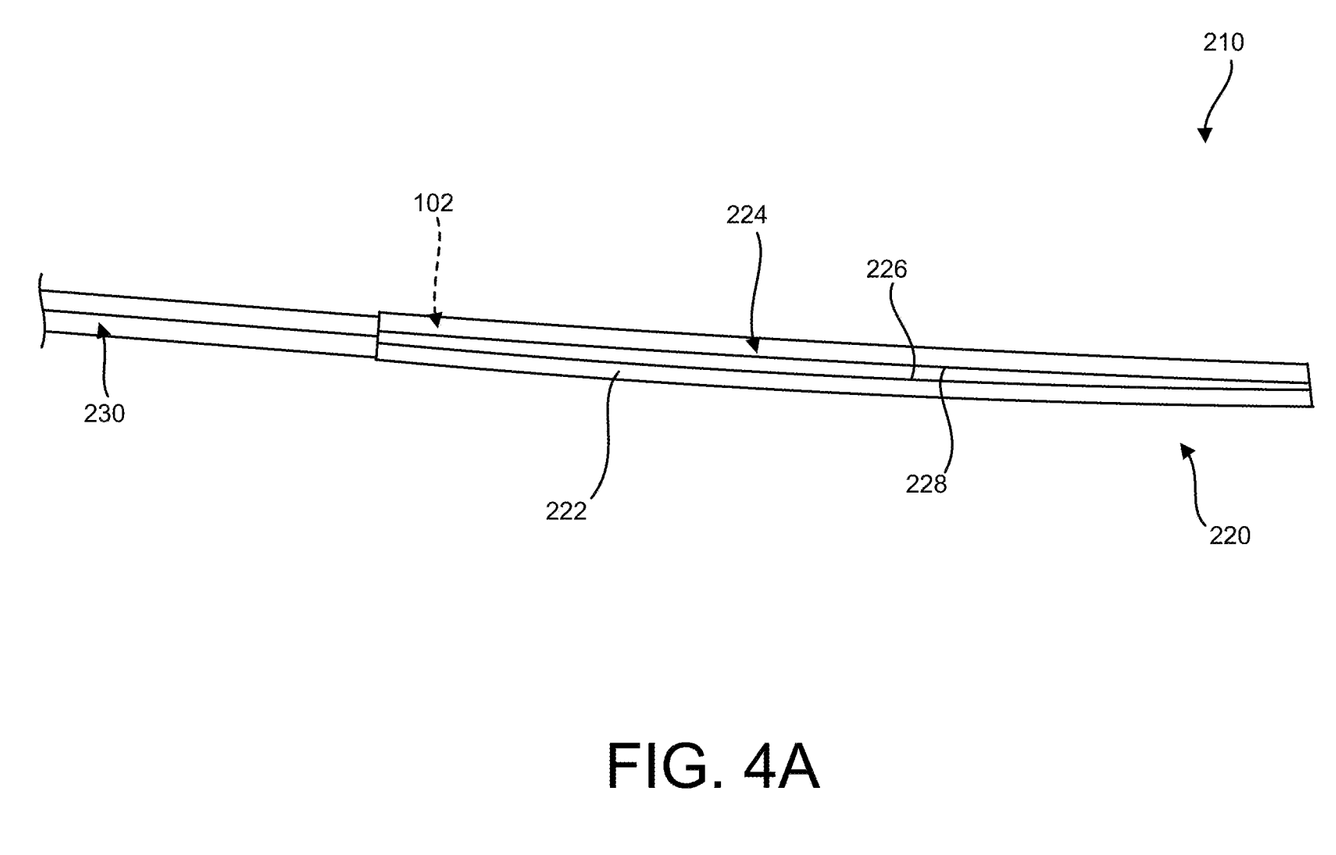
FIG. 4A depicts a second example of a sleeve in the constrained configuration, according to aspects of the present disclosure.
Figure 4B:
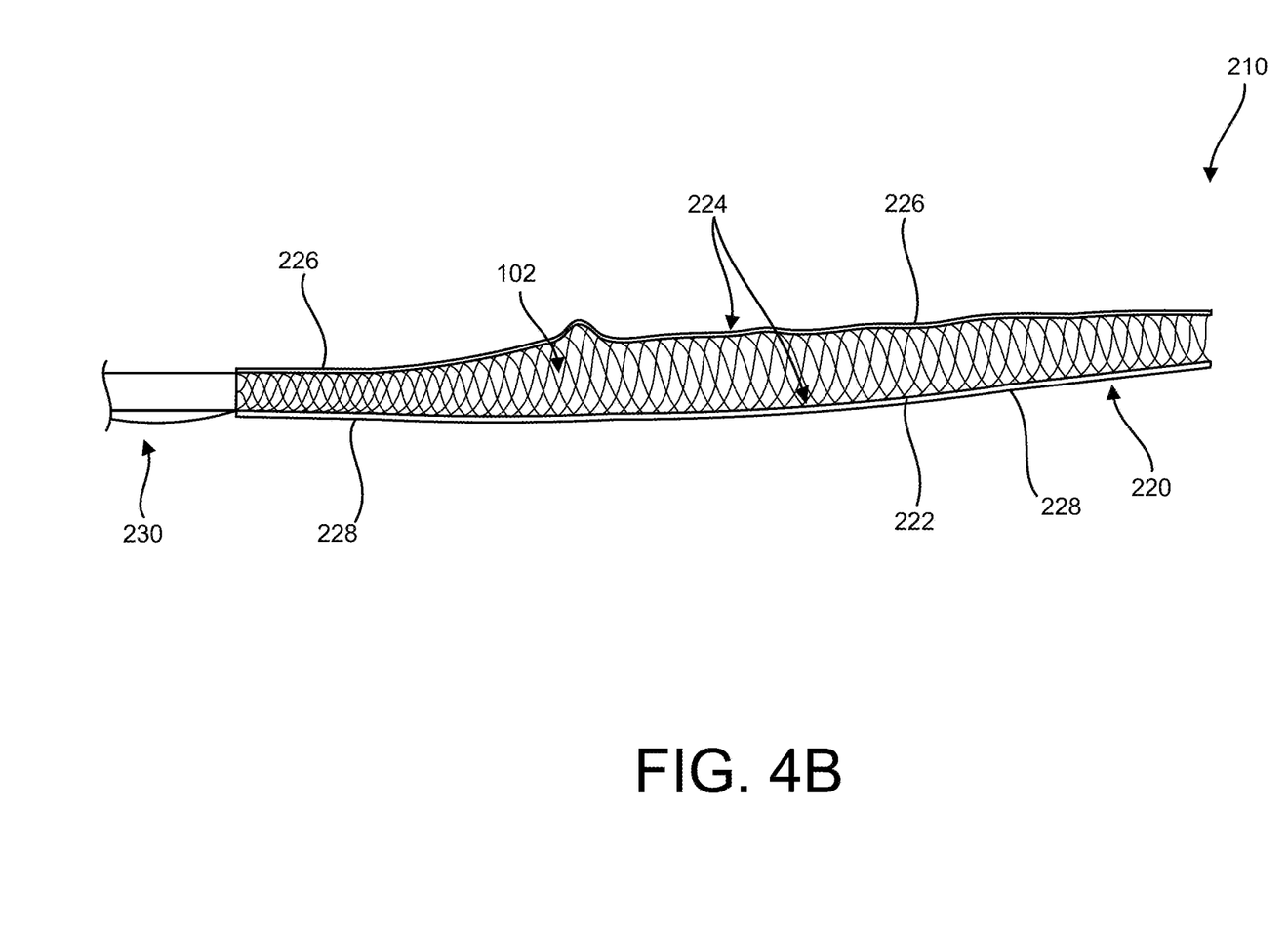
FIG. 4B depicts the second example of the sleeve in FIG. 4A in an expanded configuration, according to aspects of the present disclosure.

FIGS. 3A, 3B, 4A, and 4B show various examples of securement portions of a sleeve 220, according to aspects of the present disclosure. FIG. 3A shows a first example of a sleeve 220 in the constrained configuration, and FIG. 3B shows the first example of the sleeve 220 in an expanded configuration. FIG. 4A shows a second example of a sleeve 220 in the constrained configuration, and FIG. 4B shows the second example of the sleeve 220 in an expanded configuration.

In the first example, as shown in FIGS. 3A and 3B, the securement portion 224 can include one or more strings 240 interlaced with a tether in the tether assembly 230. In examples, the sleeve 220 comprises a sheet that has a first edge 226 and a second edge 228, and wherein the securement portion 224 comprises removably securing the first edge 226 and the second edge 228. In examples, removably securing the first edge 226 to the second edge 228 comprises lacing the first edge 226 with the second edge 228. In this manner, a string 240 in the one or more strings 240 can be woven through a portion of the sleeve 220 that extends from the first edge 226 so as to form a first series of loops 242, and a string 240 (e.g., the same string 240 or another string 240) can be woven through a portion of the sleeve 220 that extends from the second edge 228 so as to form a second series of loops 244. The tether can be strung through the first series of loops 242 and the second series of loops 244. So configured, the tether assembly 230 can be configured to unlace the first edge 226 and the second edge 228, for example, by pulling the tether proximally so as to free the first and second series of loops 242, 244 from the tether.

A second example of the of the securement portion 224, as shown in FIGS. 4A and 4B, can include a sleeve 220 that includes a film, and a securement portion 224 that includes a severable portion of the film. In examples, the film is a single continuous film having a first edge 226 and a second edge 228 such that the first and second edges 226, 228 are opposing edges of the single continuous film. The severable portion can include the first and second edges 226, 228, and the tether assembly 230 can be configured to cause the first edge 226 to sever from the second edge 228. In examples, the first and second edge 226, 228 can overlap (e.g., one over the other or vice versa), and a tether in the tether assembly 230 can pass through the overlap to hold it in place until the tether is removed. When the tether is pulled (e.g., using the grabbing force), the first and second edge 226, 228 can no longer hold the overlap and separates one from the other to open (e.g., similar to removing a pin from a hinge-and-pin connection).

Figure 5:
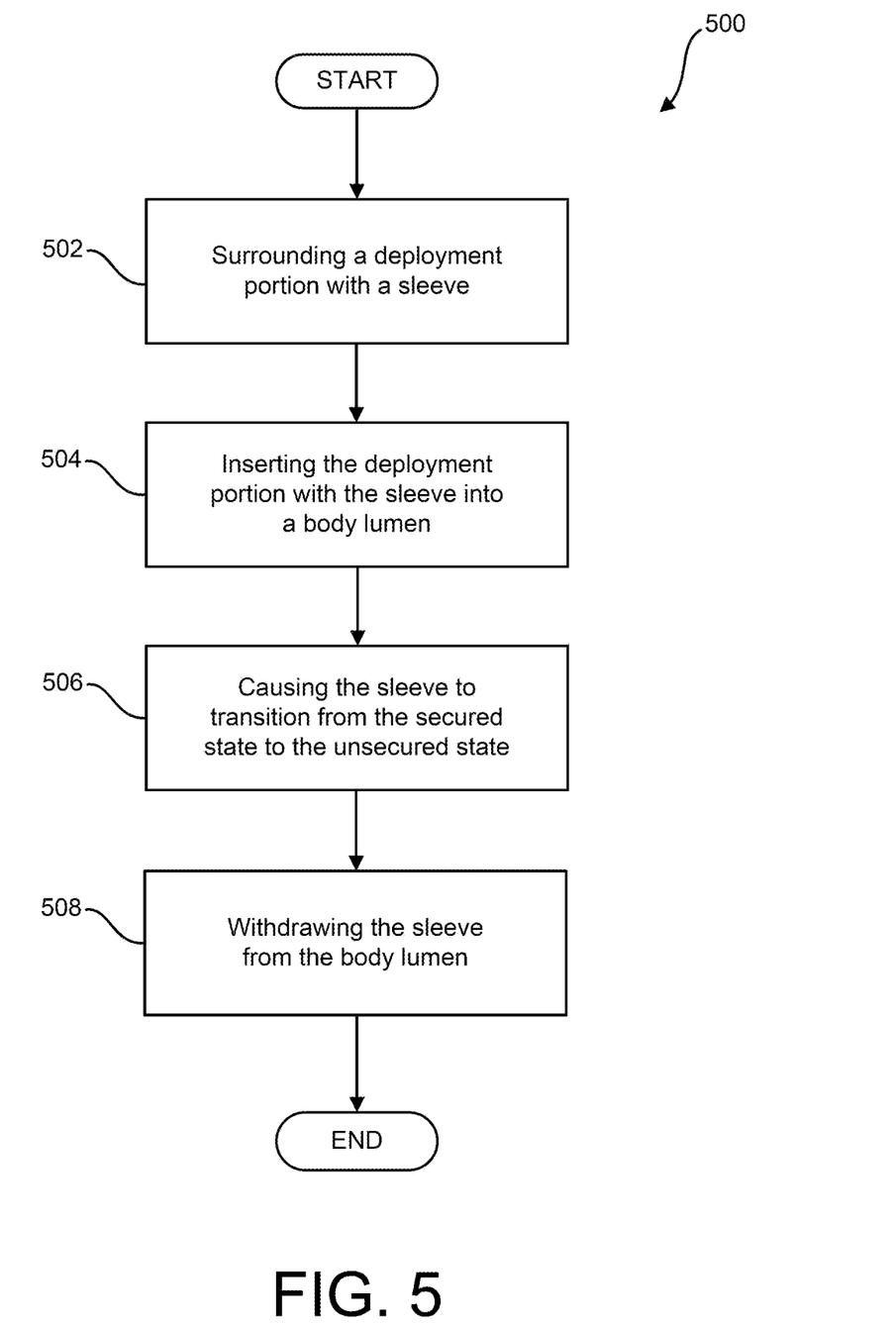
FIG. 5 depicts a flowchart of a method, according to aspects of the present disclosure.

The present disclosure includes methods of delivering a percutaneous medical device. As shown in FIG. 5, such a method 500 can include at step 502 surrounding a deployment portion of the percutaneous medical device with a sleeve, such as the sleeve discussed above. The sleeve can include a sleeve wall and a securement portion that is positioned at the sleeve wall and is actuatable between a secured state and an unsecured state, the sleeve configured to overlay a deployment portion of the percutaneous medical device so as to be delivered together with the deployment portion and to facilitate movement thereof through a delivery lumen during delivery of the percutaneous medical device, the sleeve further configured to radially move between a constrained configuration and an expanded configuration via actuation of the securement portion such that the sleeve is in the constrained configuration when the securement portion is in the secured state and in the expanded configuration when the securement portion is in the unsecured state. At step 504, the method 500 can include inserting the deployment portion of the percutaneous medical device together with the sleeve into a body lumen with the sleeve in the secured state. At step 506, the method 500 can include causing the sleeve to transition from the secured state to the unsecured state. At step 508, the method 500 can include withdrawing the sleeve from the body lumen.

Examples of the method 500 can include a multi-step insertion process. To begin, as discussed earlier, the deployment portion can be withdrawn into the sleeve. In examples, the method 500 can include inserting the percutaneous medical device together with the sleeve into an introducer. In examples, inserting the deployment portion can include inserting the introducer into the body lumen and moving the deployment portion distally relative to the introducer such that the deployment portion is outside of the introducer.

In examples, as noted prior, the sleeve can include a tether assembly that is configured to cause the sleeve to transition from the secured state to the unsecured state and withdraw the sleeve from the body lumen. In examples, a first tether of the tether assembly can be configured to cause the sleeve to transition from the secured state to the unsecured state, and a second tether of the tether assembly can be configured to withdraw the sleeve from the body lumen.

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps may be added or omitted without departing from the scope of this disclosure. Such steps may include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the present disclosure has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

We claim:

1. A delivery device for a percutaneous medical device, the delivery device comprising:
    a sleeve that includes a sleeve wall and a securement portion that is positioned at the sleeve wall and is actuatable between a secured state and an unsecured state, the sleeve configured to overlay a deployment portion of the percutaneous medical device so as to be delivered together with the deployment portion and to facilitate movement thereof through a delivery lumen during delivery of the percutaneous medical device, the sleeve further configured to radially move between a constrained configuration and an expanded configuration via actuation of the securement portion such that the sleeve is in the constrained configuration when the securement portion is in the secured state and in the expanded configuration when the securement portion is in the unsecured state; and
    a tether assembly that engages the sleeve and is configured to cause the securement portion to actuate between the secured state when the percutaneous medical device is being delivered and the unsecured state prior to when the deployment portion of the percutaneous medical device is deployed, the tether assembly further configured to withdraw the sleeve from overlaying the deployment portion when the sleeve is in the expanded configuration and to withdraw the sleeve from the delivery lumen, wherein the tether assembly is configured to withdraw the sleeve by pulling on the tether assembly in a proximal direction.

2. The delivery device of claim 1, wherein the sleeve is a constraint sleeve that is configured to constrain the deployment portion such that the deployment portion is constrained when the percutaneous medical device is being delivered and is unconstrained when the deployment portion has been deployed.

3. The delivery device of claim 1, wherein the tether assembly comprises a plurality of tethers that includes a first tether and a second tether, wherein the first tether is configured to actuate the securement portion from the secured state to the unsecured state, and wherein the second tether is configured to facilitate withdrawal of the sleeve from overlaying the deployment portion when the sleeve is in the expanded configuration and to facilitate withdrawal of the sleeve from the delivery lumen.

4. The delivery device of claim 1, wherein the sleeve comprises a sheet that has a first edge and a second edge, and wherein the securement portion comprises removably securing the first edge and the second edge.

5. The delivery device of claim 4, wherein removably securing the first edge to the second edge comprises lacing the first edge with the second edge, and wherein the tether assembly is configured to unlace the first edge and the second edge.

6. The delivery device of claim 1, wherein the sleeve comprises a film, and the securement portion comprises a severable portion of the film.

7. The delivery device of claim 6, wherein the film is a single continuous film having a first edge and a second edge such that the first and second edges are opposing edges of the single continuous film, wherein the severable portion includes the first and second edges, and wherein the tether assembly is configured to cause the first edge to sever from the second edge.

8. The delivery device of claim 1, wherein the sleeve provides a lower delivery force than that of the percutaneous medical device.

9. A delivery assembly for a percutaneous medical device, the delivery assembly comprising:
    an introducer configured to removably house a deployment portion of the percutaneous medical device in a delivery lumen of the introducer; and
    a delivery device for the percutaneous medical device, the delivery device comprising:
    a sleeve that includes a sleeve wall and a securement portion that is positioned at the sleeve wall and is actuatable between a secured state and an unsecured state, the sleeve configured to overlay the deployment portion of the percutaneous medical device so as to be delivered together with the deployment portion and to facilitate movement thereof through the delivery lumen during delivery of the percutaneous medical device, the sleeve further configured to radially move between an expanded configuration and a constrained configuration via actuation of the securement portion such that the sleeve is in the constrained configuration when the securement portion is in the secured state and in the expanded configuration when the securement portion is in the unsecured state; and a tether assembly that engages the sleeve and is configured to cause the securement portion to actuate between the secured state when the percutaneous medical device is being delivered and the unsecured state prior to when the deployment portion of the percutaneous medical device is deployed, the tether assembly further configured to withdraw the sleeve from overlaying the deployment portion when the sleeve is in the expanded configuration and to withdraw the sleeve from the delivery lumen, wherein the tether assembly is configured to withdraw the sleeve by pulling on the tether assembly in a proximal direction.

10. The delivery assembly of claim 9, wherein the sleeve is a constraint sleeve that is configured to constrain the deployment portion such that the deployment portion is constrained when the percutaneous medical device is being delivered and is unconstrained when the deployment portion has been deployed.

11. The delivery assembly of claim 9, wherein the tether assembly comprises a plurality of tethers that includes a first tether and a second tether, wherein the first tether is configured to actuate the securement portion from the secured state to the unsecured state, and wherein the second tether is configured to facilitate withdrawal of the sleeve from overlaying the deployment portion when the sleeve is in the expanded configuration and to facilitate withdrawal of the sleeve from the delivery lumen.

12. The delivery assembly of claim 9, wherein the sleeve comprises a sheet that has a first edge and a second edge, and wherein the securement portion comprises removably securing the first edge and the second edge.

13. The delivery assembly of claim 12, wherein removably securing the first edge to the second edge comprises lacing the first edge with the second edge, and wherein the tether assembly is configured to unlace the first edge and the second edge.

14. The delivery assembly of claim 9, wherein the sleeve comprises a film, and the securement portion comprises a severable portion of the film.

15. The delivery assembly of claim 14, wherein the film is a single continuous film having a first edge and a second edge such that the first and second edges are opposing edges of the single continuous film, wherein the severable portion includes the first and second edges, and wherein the tether assembly is configured to cause the first edge to sever from the second edge.

16. The delivery assembly of claim 9, wherein the sleeve provides a lower delivery force than that of the percutaneous medical device.

17. A method of delivering a percutaneous medical device, the method comprising:

surrounding a deployment portion of the percutaneous medical device with a sleeve that includes a sleeve wall and a securement portion that is positioned at the sleeve wall and is actuatable between a secured state and an unsecured state, the sleeve configured to overlay the deployment portion of the percutaneous medical device so as to be delivered together with the deployment portion and to facilitate movement thereof through a delivery lumen during delivery of the percutaneous medical device, the sleeve further configured to radially move between an expanded configuration and a constrained configuration via actuation of the securement portion such that the sleeve is in the constrained configuration when the securement portion is in the secured state and in the expanded configuration when the securement portion is in the unsecured state;

inserting the deployment portion of the percutaneous medical device together with the sleeve into a body lumen in a distal direction with the sleeve in the secured state;

causing the sleeve to transition from the secured state to the unsecured state; and withdrawing the sleeve from the body lumen by pulling in a proximal direction.

18. The method of claim 17 further comprising inserting the percutaneous medical device together with the sleeve into an introducer, and wherein inserting the deployment portion includes inserting the introducer into the body lumen and moving the deployment portion distally relative to the introducer such that the deployment portion is outside of the introducer.

19. The method of claim 17, wherein a tether assembly is configured to cause the sleeve to transition from the secured state to the unsecured state and withdraw the sleeve from the body lumen.

20. The method of claim 19, wherein a first tether of the tether assembly is configured to cause the sleeve to transition from the secured state to the unsecured state; and wherein a second tether of the tether assembly is configured to withdraw the sleeve from the body lumen.

* * * * *